United States Patent [19]
Westfall

[11] Patent Number: 6,122,370
[45] Date of Patent: *Sep. 19, 2000

[54] TELEPHONE DESIGN FOR MASS CUSTOMIZATION

[75] Inventor: Alan Patrick Westfall, Calgary, Canada

[73] Assignee: Nortel Networks Limited, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/980,763

[22] Filed: Dec. 1, 1997

[51] Int. Cl.$^7$ ........................................................ H04M 1/00
[52] U.S. Cl. ............................................ 379/428; 379/435
[58] Field of Search ..................................... 379/435, 436, 379/428, 446, 455, 454, 433

[56] References Cited

U.S. PATENT DOCUMENTS 5,732,331  3/1998  Harms ...................................... 379/433

Primary Examiner—Jack Chiang
Attorney, Agent, or Firm—Cobrin & Gittes

[57] ABSTRACT

An apparatus including a stand for housing a telephone electronics module and a cover for housing user interface components. There is a mechanical connector on the housing and a complementary mechanical connector on the cover, the mechanical connector and the complementary mechanical connector being engagable to connect the cover to the stand. An electrical connector on the stand is operable to communicate with the telephone electronics module. A complementary electrical connector on the cover is operable to communicate with the interface components. The electrical connector and the complementary electrical connector are placed in communication with each other when the mechanical connector is engaged with the complementary mechanical connector, to provide electrical communication between the telephone electronics module and the interface components.

15 Claims, 3 Drawing Sheets

TELEPHONE DESIGN FOR MASS CUSTOMIZATION

FIELD OF THE INVENTION

This invention relates to apparatus and methods of connecting a telephone cover to a telephone stand.

BACKGROUND OF THE INVENTION

Conventionally, telephones are made to include a single housing with a plurality of base options for mounting the single housing to a desk or to a wall. The housing conventionally houses the electronics for implementing telephone functionality interfacing to a subscriber line and for providing signals to a handset or speakerphone and for providing signals to a keypad and display.

Housing circuit boards and other components for telephone functionality within a common housing often requires shaping the circuit board or custom mounting the components in such a manner as to occupy available space within the housing. This necessitates custom designing of printed circuit boards and custom mounting of components for each different telephone shape or appearance. This adds additional cost and complexity to redesigning telephones to have unique shapes and appearances to establish product differentiation. Consequently, the cost to produce differentiated products is relatively high. What would be desirable, therefore, would be separating shape and appearance features of a telephone cover from functional features in a mass-produced telephone. The present invention addresses this need.

SUMMARY OF THE INVENTION

In accordance with one aspect of the invention, there is provided an apparatus including a stand for housing a telephone electronics module and a cover for housing user interface components. The apparatus further includes a mechanical connector on the housing and a complementary mechanical connector on the cover, the mechanical connector and the complementary mechanical connector being engagable to connect the cover to the stand. The apparatus also includes an electrical connector on the stand and operable to communicate with the telephone electronics module. The apparatus further includes a complementary electrical connector on the cover and operable to communicate with the interface components, the electrical connector and the complementary electrical connector being placed in communication with each other when the mechanical connector is engaged with the complementary mechanical connector, to provide electrical communication between the telephone electronics module and the interface components.

Preferably, the mechanical connector and the complementary mechanical connector are operable to rotate relative to each other.

The electrical connector and the complementary electrical connector may be mounted adjacent the mechanical connector and the complementary mechanical connector respectively.

The complementary electrical connector is urged against the electrical connector when the mechanical connector and the complementary mechanical connector are engaged.

The electrical connector may include a circuit board having a plurality of contacts and the complementary electrical connector may include a flexible circuit substrate. Preferably, the telephone electronics module includes components mounted on the circuit board and preferably, the interface components include a keypad having circuit components on the flexible circuit substrate.

Preferably, the cover has an axis of rotation about which the cover is operable to rotate relative to the stand, the circuit board having a contact surface generally coincident with the axis of rotation and the contacts being positioned on the contact surface. Preferably, the flexible circuit substrate is urged against the contact surface when the cover and the stand are engaged.

Preferably, the apparatus includes a compliant member positioned adjacent the flexible circuit substrate to urge the flexible circuit substrate against the contact surface.

Preferably, the apparatus includes a tilt lock for selectively locking the cover in an orientation relative to the stand.

The mechanical connector may include a hook on the stand and the complementary mechanical connector may include a pivot pin operable to be received and held by the hook on the stand.

Preferably, the mechanical connector includes first and second spaced apart hooks and the complementary mechanical connector includes first and second spaced apart, generally axially aligned pivot pins for engaging the first and second hooks respectively. Preferably, the electrical connector is positioned between the first and second hooks and preferably, the complementary electrical connector is positioned between the first and second pivot pins.

Preferably, the complementary mechanical connector has an axis of rotation coincident with an axis of the first and second pivot pins.

In accordance with another aspect of the invention, there is provided a universal telephone stand apparatus, the apparatus including an enclosure for housing a telephone electronics module and including a mechanical connector on the enclosure, the mechanical connector being engagable with a complementary mechanical connector on a cover to connect the cover to the stand. The apparatus also includes an electrical connector operable to communicate with the telephone electronics module and operable to engage a complementary electrical connector in communication with interface components in the cover, such that the electrical connector and the complementary electrical connector are placed in communication with each other when the mechanical connector is engaged with the complementary mechanical connector, to provide electrical communication between the telephone electronics module and the interface components.

Preferably, the mechanical connector and the complementary mechanical connector are operable to rotate relative to each other.

The electrical connector may be mounted adjacent the mechanical connector and may include a circuit board having a plurality of contacts. Preferably, the telephone electronics module includes components mounted on the circuit board.

Preferably, the mechanical connector defines an axis of rotation about which the cover is operable to rotate relative to the stand, and preferably, the circuit board has a contact surface generally coincident with the axis of rotation, the contacts being positioned on the contact surface.

Preferably, the apparatus includes a tilt lock for selectively locking the cover in an orientation relative to the stand.

The mechanical connector may include a hook on the stand but preferably, the mechanical connector includes first and second spaced apart hooks. Preferably, the electrical connector is positioned between the first and second hooks.

In accordance with another aspect of the invention, there is provided a telephone cover apparatus including an enclosure for housing user interface components of a telephone. The apparatus also includes a complementary mechanical connector for engaging a mechanical connector on a stand for housing a telephone electronics module, to connect the cover to the stand. The apparatus further includes a complementary electrical connector operable to communicate with the interface components, and operable to engage an electrical connector on the stand such that the complementary electrical connector is placed in communication with the electrical connector when the mechanical connector is engaged with the complementary mechanical connector, to provide electrical communication between the telephone electronics module and the interface components.

Preferably, the mechanical connector and the complementary mechanical connector are operable to rotate relative to each other.

The complementary electrical connector may be mounted adjacent the complementary mechanical connector.

Preferably, the complementary electrical connector is urged against the electrical connector when the mechanical connector and the complementary mechanical connector are engaged.

Preferably, the complementary electrical connector includes a flexible circuit substrate and the interface components include a keypad having circuit components on the flexible circuit substrate.

Preferably, the cover has an axis of rotation about which the cover is operable to rotate relative to the stand, and preferably, the flexible circuit substrate is urged against a contact surface of a circuit board on the stand when the cover and the stand are engaged.

Preferably, the apparatus includes a compliant member positioned adjacent the flexible circuit substrate to urge the flexible circuit substrate against the contact surface.

Preferably, the apparatus includes a tilt lock for selectively locking the cover in an orientation relative to the stand.

The complementary mechanical connector may include a pivot pin operable to be received and held by a hook on the stand but preferably, the complementary mechanical connector includes first and second spaced apart, generally axially aligned pivot pins for engaging the first and second hooks respectively on the stand. Preferably, the complementary electrical connector is positioned between the first and second pivot pins.

Preferably, the complementary mechanical connector has an axis of rotation coincident with an axis of the first and second pivot pins.

BRIEF DESCRIPTION OF THE DRAWINGS

In drawings which illustrate embodiments of the invention.

DETAILED DESCRIPTION

Figure 1:
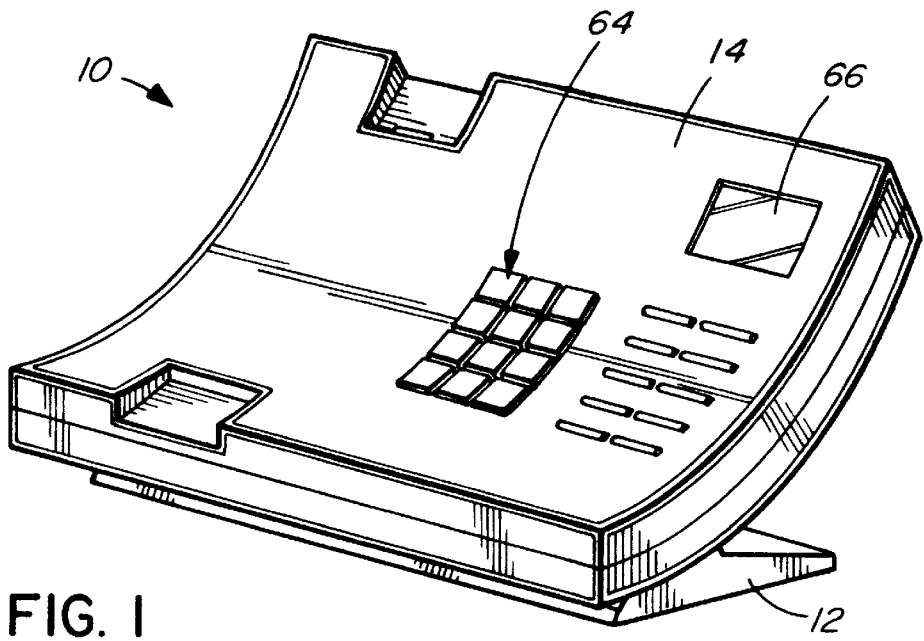
FIG. 1 is a perspective view of a telephone apparatus according to a first embodiment of the invention.

Referring to FIG. 1, a telephone apparatus according to a first embodiment of the invention is shown generally at 10. The telephone apparatus includes a universal telephone stand apparatus 12 and a telephone cover apparatus 14, the stand and cover being connected together.

Figure 2:
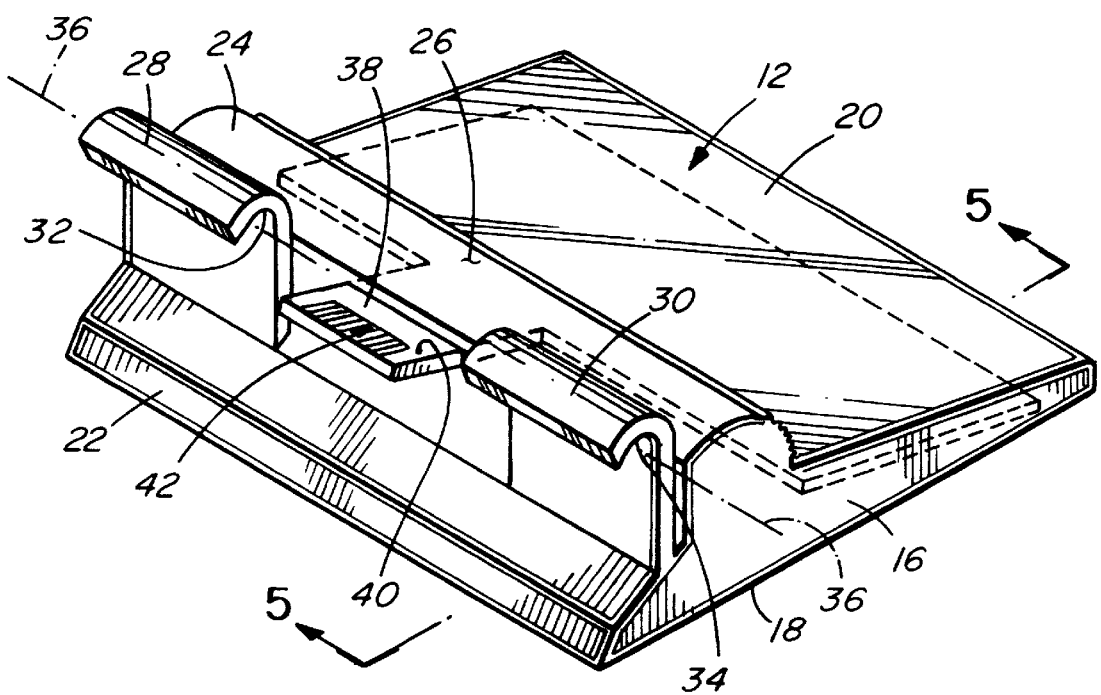
FIG. 2 is a perspective view of a stand of the telephone apparatus shown in FIG. 1.

Referring to FIG. 2, the stand 12 is shown in greater detail. The stand includes a base 16 having a flat bottom surface 18 for resting on a flat surface of a table top or the like. The stand has a rear portion 20 and a front portion 22. The rear portion slopes gently upwardly toward the front portion and terminates in a projection 24 extending transversely across the base 16. The projection 24 has a generally cylindrical surface 26. Adjacent the cylindrical surface and projecting beyond the cylindrical surface are first and second hooks 28 and 30 having respective receptacle portions 32 and 34.

Figure 3:
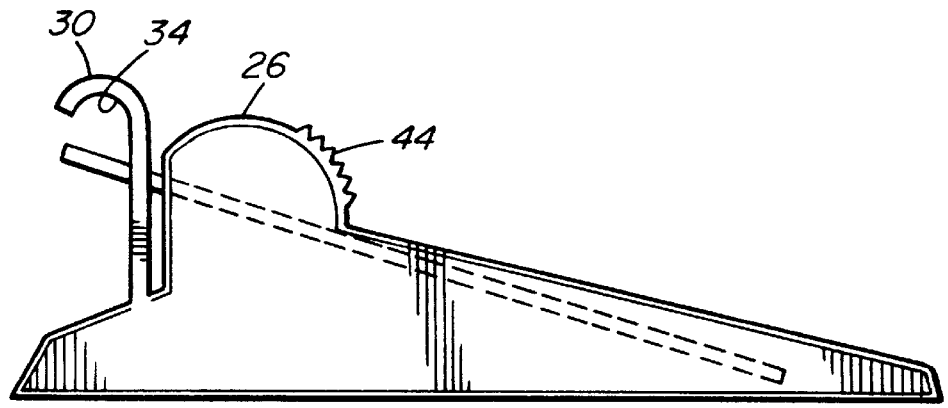
FIG. 3 is a side view of the stand of the telephone apparatus shown in FIG. 1.

The first and second receptacle portions 32 and 34 have a concave cylindrical shape formed about a rotational axis 36. Referring to FIG. 3, the cylindrical surface 26 has a plurality of ratchet teeth 44 on a side opposite the hooks.

Referring back to FIG. 2, the stand acts as an enclosure to house a circuit board 38 on which a plurality of components are mounted to achieve the functionality of a telephone electronics module. Thus, the telephone electronics module includes components mounted on the circuit board and the stand houses a telephone electronics module. In this embodiment, the telephone electronics module includes basic telephone circuitry with the exception of keypad and display components, for interfacing to a subscriber line.

The circuit board has a contact surface 40 which extends out of the stand. The contact surface has a plurality of contacts shown generally at 42 thereon, such contacts being disposed along the rotational axis 36. The circuit board is rigidly held in the position indicated wherein the contact surface 40 is generally coplanar with the rotational axis 36 and the contacts 42 are coincident therewith.

Figure 4:
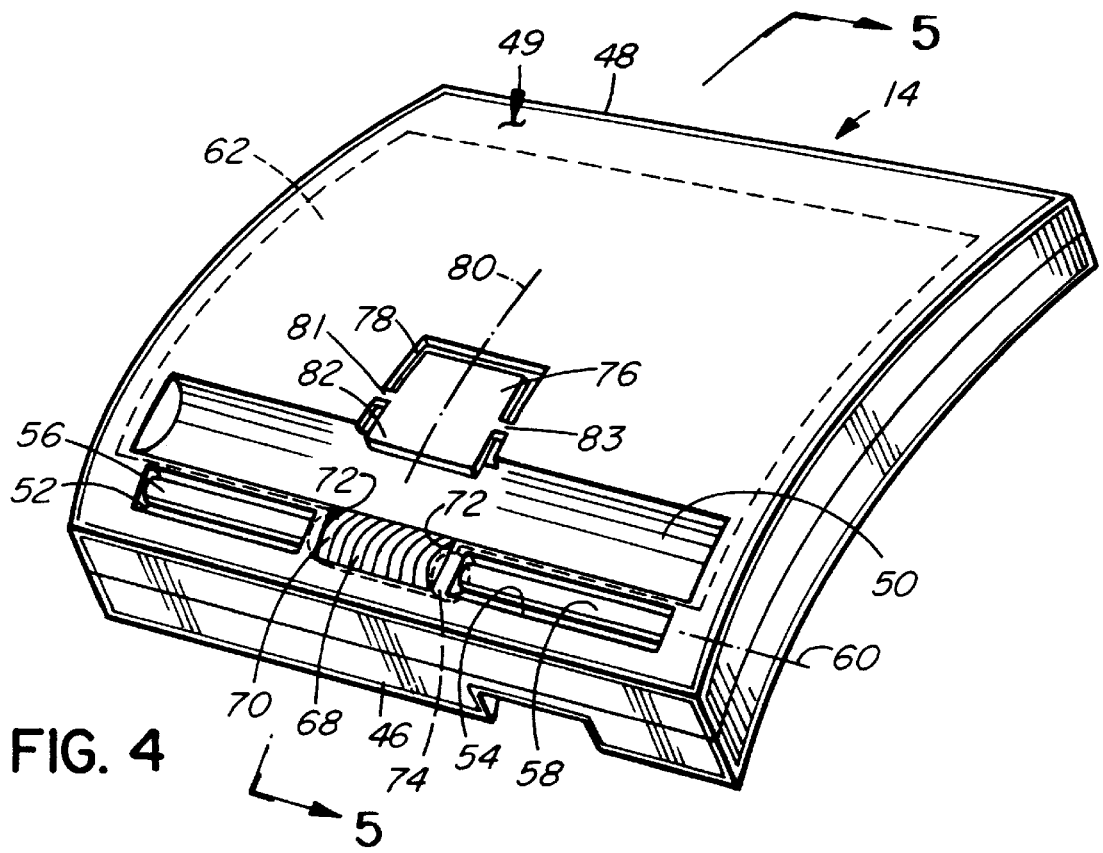
FIG. 4 is an underside view of a cover of the telephone apparatus shown in FIG. 1.

Referring to FIG. 4, a cover is shown in greater detail at 14. The cover has a forward portion 46, a rearwardly disposed portion 48, and a flat bottom surface shown generally at 49.

Disposed in the flat surface is a transversely extending cylindrical well 50 having a shape complementary to the cylindrical surface 26 shown in FIG. 2, for receiving the projection 24.

Disposed adjacent the cylindrical well 50, there are first and second pin wells 52 and 54 in which are disposed first and second axially aligned pivot pins 56 and 58, aligned about a common axis 60. The first and second pivot pins 56 and 58 are thus spaced apart on opposite sides of the bottom surface of the cover 14.

A flexible circuit substrate 62 is disposed and housed inside the cover and is imprinted with conductive traces which act as circuit connections for a keypad shown generally at 64 in FIG. 1 and for connecting to a liquid crystal display 66, also as shown in FIG. 1. Thus the interface components include a keypad having circuit components on the flexible circuit substrate. The cover thus acts as an enclosure for housing user-interface components of a telephone.

Referring back to FIG. 4, the flexible circuit substrate 62 has an externally projecting portion 68 having a plurality of exposed circuit traces 70 which are accessible through an opening 72 in the bottom surface 49 of the cover between and adjacent the first and second spaced apart pivot pins 56 and 58. A compliant rubber pressure pad shown in broken outline at 74 is positioned adjacent the externally projecting portion 68 of the flexible circuit substrate to bias or urge the exposed portion outwardly of the opening 72.

It will be appreciated that the opening 72 is disposed between the forward portion 46 and the cylindrical well 50. On an opposite side of the cylindrical well 50, however, there is located in the flat bottom surface a rotatable pawl member 76 which is formed in a receptacle 78 formed longitudinally in the bottom surface 49. The pawl member 76 is rotatable in a direction angularly to a longitudinal axis 80 of the cover such that a relatively small portion 82 of the pawl member 76 is rotatable into and out of the cylindrical well 50. First and second pivot tabs 81 and 83 formed from the plastic of the flat bottom surface act as resilient pivot points which bias the pawl member 76 such that the pawl member 76 is urged to rest coplanar with the flat bottom surface in which position the small portion 82 extends slightly into the cylindrical well 50 as shown. Rotation of the pawl member about the pivot tabs 81 and 83 moves the small portion 82 out of the cylindrical well 50.

Operation

Figure 5:
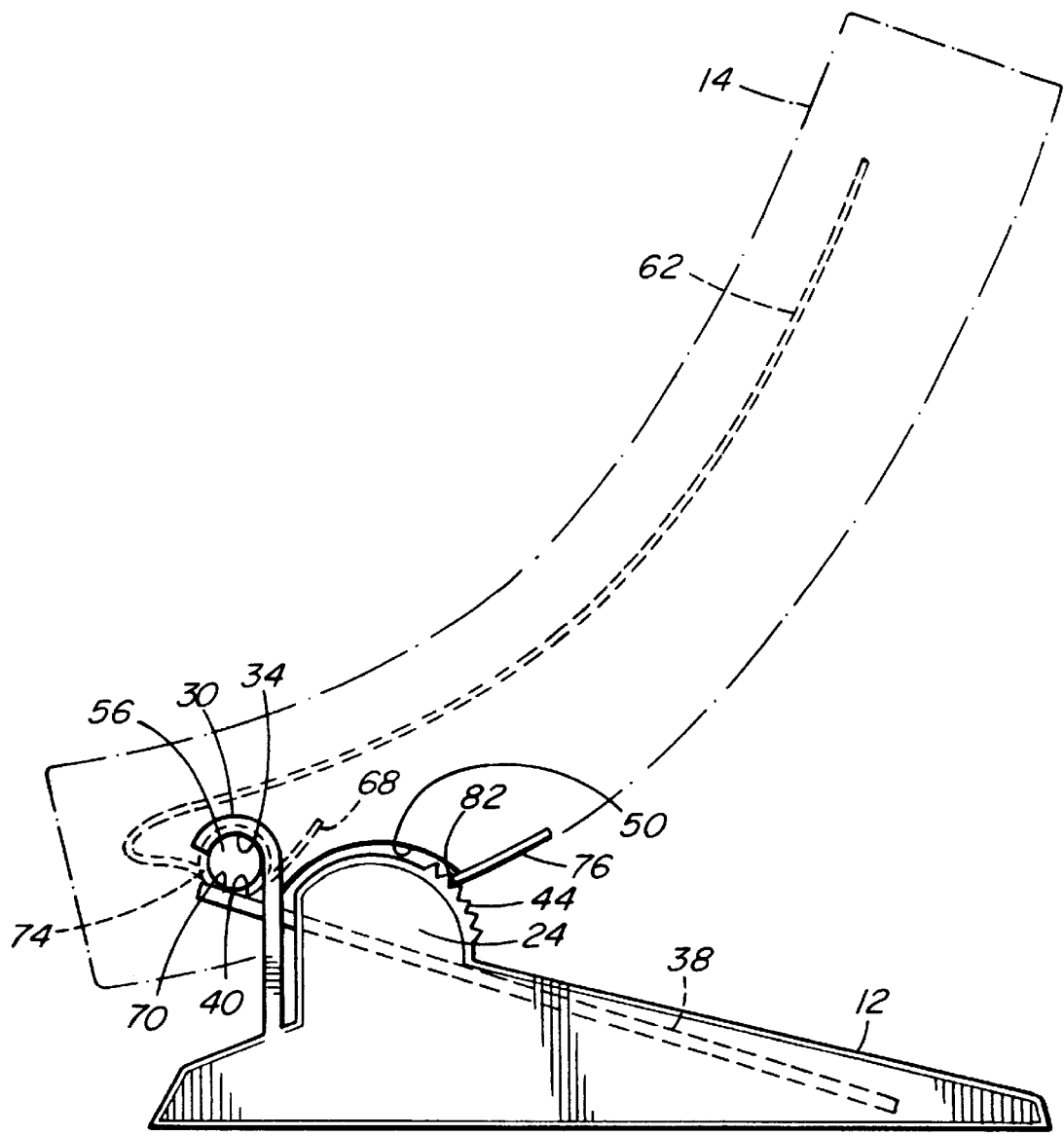
FIG. 5 is a cross-sectional view of the telephone apparatus shown in FIG. 1.

Referring to FIG. 5, the cover 14 is connected to the stand 12 by orienting the cover relative to the stand such that the hooks, only one of which is shown at 34, are received in respective pin wells, only one of which is shown at 52, and such that the pins, only one of which is shown at 56, are received in respective of receptacles, only one of which is shown at 34. Thus, the first and second spaced apart hooks act as a mechanical connector on the base and the first and second pivot pins act as a complementary mechanical connector on the cover. The mechanical connector and the complementary mechanical connector are engageble to connect the cover to the stand.

During the engagement of the hooks and pins, the externally projecting portion 68 of the flexible substrate 62 comes in contact with the contact surface 40 of the printed circuit board 38 and the compliant rubber pressure pad 74 is compliantly and resiliently deformed so as to bias or urge the externally projecting portion 68 and circuit traces 70 against the contact surface 40 and contacts 42 on the printed circuit board 38 so as to establish an electrical connection therebetween. Thus, communication is established between the circuit components on the flexible substrate 62 and the circuit board 38. The circuit board acts as an electrical connector disposed between the first and second hooks and is operable to communicate with the telephone electronics module and the externally projecting portion 68 of the flexible substrate 62 acts as a complementary electrical connector disposed between the first and second pivot pins and is operable to communicate with the interface components. The electrical connector and the complementary electrical connector are thus placed in communication with each other when the mechanical connector is engaged with the complementary mechanical connector, to provide electrical communication between the telephone electronics module and the interface components. In addition, it will be appreciated that the electrical connector and the complementary electrical connector are mounted adjacent the mechanical connector and the complementary mechanical connector respectively.

As the receptacle portions 32 and 34 are concave cylindrical shaped and as the pivot pins 56 and 58 are cylindrically shaped. The receipt of the first and second pivot pins in the first and second receptacles effectively gives the complementary mechanical connector an axis of rotation coincident with an axis of the first and second pivot pins. Thus, relative rotation between the stand and the cover is facilitated. In other words, the mechanical connector and the complementary mechanical connector are operable to rotate relative to each other.

The compliant rubber pressure pad 74 urges the externally projecting portion 68 of the flexible substrate 62 against the contact surface 40 and contacts 42 of the printed circuit board 38 throughout the entire range of rotation of the cover 14 relative to the stand 12. Thus, the cover has an axis of rotation about which the cover is operable to rotate relative to the stand, the circuit board having a contact surface generally coincident with the axis of rotation, the contacts being positioned on the contact surface, and the flexible circuit substrate being urged against the contact surface when the cover and the stand are engaged. Electrical connection between the telephone electronics module and the interface components is established upon engagement of the hooks 28 and 30 with the pivot pins 56 and 58 respectively and electrical communication is maintained throughout the entire range of rotation of the cover 14 relative to the stand 12. In other words, the complementary electrical connector is urged against the electrical connector when the mechanical connector and the complementary mechanical connector are engaged.

FIG. 5

Referring to FIG. 5, when the hooks and pins are engaged, the small portion 82 of the pawl member 76 is received between the teeth 44 whereby rotation of the stand relative to the cover is prevented. The use of the plurality of teeth 44, and the rotatable nature of the pawl member 76 allows the pawl member 76 to be withdrawn from between the teeth 44 to permit relative rotation and the tabs 81 and 83 urging the pawl member 76 toward the cylindrical well 50 cause the pawl member 76 to be urged between respective teeth 44, to again lock the stand and cover relative to each other, to prevent further rotation. In this manner, the cover is orientable relative to the stand and is operable to be locked in any desired orientation. Thus, the pawl member 76 and teeth 44 cooperate to act as a tilt lock for selectively locking the cover in an orientation relative to the stand.

It will be appreciated that the connection of the cover to the stand requires no tools and that the cover may be quickly and easily connected to the stand. This facilitates the independent manufacture of covers and stands for rapid and easy assembly and also facilitates a single stand design to be used with a plurality of different shaped covers provided the covers have complementary mechanical and complementary electrical connectors. This allows custom covers to be used with a common stand design. This, of course, facilitates differentiation in the market place.

While specific embodiments of the invention have been described and illustrated, such embodiments should be considered illustrative of the invention only and not as limiting the invention as construed in accordance with the accompanying claims.

What is claimed is:

1. A telephone cover apparatus comprising:
   a) an enclosure for housing user interface components of a telephone;
   b) a complementary mechanical connector for engaging a mechanical connector on a stand for housing a telephone electronics module, to connect said cover to said stand; and
   c) a complementary electrical connector adjacent to said mechanical connector operable to communicate with said interface components, and operable to engage an electrical connector on said stand such that said complementary electrical connector is placed in communication with said electrical connector when said mechanical connector is engaged with said complementary mechanical connector, to provide electrical communication between said telephone electronics module and said interface components throughout an entire range of rotation of said enclosure relative to said telephone electronics module.

2. A telephony apparatus comprising:
a) a stand for housing a telephone electronics module;
b) a cover for housing user interface components;
c) a mechanical connector extending from said stand and a complementary mechanical connector on said cover, said mechanical connector and said complementary mechanical connector being engageable to connect said cover to said stand; and
d) an electrical connector operable to communicate with said telephone electronics module and a complementary electrical connector operable to communicate with said interface components, said electrical connector and said complementary electrical connector being placed in communication with each other when said mechanical connector is engaged with said complementary mechanical connector such that electrical communication between said telephone electronics module and said interface components is sustained throughout an entire rotation range of said cover relative to said stand.

3. A telephony apparatus, comprising:
a) a stand configured and arranged to house a telephone electronics module;
b) a cover configured and arranged to house user interface components;
c) a pair of spaced apart elements extending from said stand and a pair of further spaced apart elements on said cover, said pair of spaced apart elements and said pair of further spaced apart elements being configured and arranged to engage with each other in a complementary manner to connect said cover to said stand; and
d) an electrical connector operable to communicate with said telephone electronics module and a complementary electrical connector operable to communicate with said interface components, said electrical connector and said complementary electrical connector being placed in communication with each other when said pair of spaced apart elements are engaged with said pair of further spaced apart elements to sustain electrical communication between said telephone electronics module and said interface components throughout a rotation range of said cover relative to said stand, said electrical connector and said complementary electrical connector when placed in communication with each other being arranged between said pair of spaced apart elements and said pair of further spaced apart elements.

4. A telephony apparatus comprising:
a) a stand configured and arranged to house telephony electronics;
b) a stand connector extending from said stand, said stand connector being engagable with a corresponding connector for receiving a user interface component engagable with said telephony electronics; and
c) a pair of spaced apart elements extending from said stand and being mechanically engagable in a complementary manner with a pair of further spaced apart elements of a cover, said stand connector being arranged between said pair of spaced apart elements, said stand connector being configured and arranged to provide electrical communication sustainable throughout a rotation range of the cover with respect to said stand.

5. A telephony apparatus comprising:
a) a cover configured and arranged to house user interface components;
b) a cover connector extending from said cover, said cover connector being engagable with a corresponding connector of a stand to receive telephony electronics engagable with said user interface components; and
c) a pair of spaced apart elements extending from said cover and being mechanically engagable in a complementary manner with a pair of further spaced apart elements of the stand, said cover connector being arranged between said pair of spaced apart elements, said cover connector being configured and arranged to provide electrical communication sustainable throughout a rotation range of the cover with respect to the stand.

6. An apparatus as claimed in claim 2 wherein said complementary electrical connector is urged against said electrical connector when said mechanical connector and said complementary mechanical connector are engaged.

7. An apparatus as claimed in claim 6 wherein said rigid substrate includes a circuit board having a plurality of contacts, said contact surface including said plurality of contacts.

8. An apparatus as claimed in claim 7 wherein said complementary electrical connector includes a flexible circuit substrate.

9. An apparatus as claimed in claim 8 wherein said cover has an axis of rotation about which said cover is operable to rotate relative to said stand, and wherein said contact surface is generally coincident with said axis of rotation, said flexible circuit substrate being urged against said contact surface when said cover and said stand are engaged.

10. An apparatus as claimed in claim 9 further including a compliant pressure pad positioned adjacent said flexible circuit substrate to urge said flexible circuit substrate against said contact surface.

11. An apparatus as claimed in claim 2 wherein said mechanical connector includes first and second spaced apart hooks on said stand, said first and second hooks providing said first and second receptacles respectively.

12. An apparatus as claimed in claim 1 wherein said complementary mechanical connector has an axis of rotation coincident with an axis of said first and second pivot pins.

13. An apparatus as claimed in claim 1 wherein said cover has an axis of rotation about which said cover is operable to rotate relative to said stand, and further including a flexible circuit substrate urged against a contact surface of a circuit board on said stand when said cover and said stand are engaged.

14. An apparatus as claimed in claim 2, wherein said mechanical connector and said complementary mechanical connector include engaging elements, said engaging elements including two axially spaced apart pivot pins and two spaced apart hooks.

15. An apparatus as claimed in claim 14, wherein said electrical connector is positioned between said two pivot pins.

* * * * *